Patented Dec. 6, 1932

1,890,158

UNITED STATES PATENT OFFICE

FRANK FLOYD LINDSTAEDT, OF OAKLAND, CALIFORNIA, ASSIGNOR TO HERCULES GLUE COMPANY, OF SAN FRANCISCO, CALIFORNIA, A CORPORATION OF CALIFORNIA

SPREADER AND EMULSIFIER FOR SPRAY COMPOSITIONS

No Drawing.    Application filed November 20, 1928.  Serial No. 320,758.

My invention relates to spray compositions, and particularly to spray emulsions for horticultural and agricultural uses.

An object of my invention is the provision of an emulsifying agent in spray compositions, which will effect a uniform and even distribution of the spray composition on the object sprayed.

Another object of my invention is the provision of an emulsifying agent of the character described, which can be used to control the thickness of the film formed by the application of the spray composition on the object sprayed.

Another object of my invention is the provision in a spray composition of a substance for controlling the degree of penetration of the spray on the object sprayed.

Another object of my invention is the provision of an emulsifying agent of the character set forth and/or penetration controller, in horticultural and agricultural sprays generally of the oil and water emulsion types.

Another object of my invention is the provision of an emulsifying agent of the character described and/or penetration controller, which can be incorporated in concentrated commercial oil emulsion and/or colloidal compositions, to be emulsified with water for forming spray compositions of the oil and water type.

A further object of my invention is the provision of a spray composition of the character described which requires only one application on the object sprayed to provide an effective and protective film.

My invention possesses other objects and valuable features, some of which will be set forth in the following description of my invention. It is to be understood that I do not limit myself to the showing made by the said description, as I may adopt varying forms of my invention within the scope of the claims.

Spray compositions most generally used for application to plants, trees, and especially citrus and deciduous fruit trees are of the oil and water emulsion type. At present, mineral oils are more widely used than vegetable or animal oils, and there are numerous concentrated oil colloids and/or emulsions on the market which when mixed and agitated with water form a composition that can be sprayed. In preparing the concentrated mineral, animal, or vegetable oil emulsion and/or colloid, a quantity of light or heavy hydrocarbon oil, animal oil such as whale or sperm oil, or vegetable oil such as cottonseed or soya bean oil, is generally mixed in any well known manner, such as by a colloid mill, with an emulsifying agent and a small quantity of water to form a colloidal paste and/or emulsion containing about 85% oil. For the emulsifying agent, lignin liquor, soaps such as the alkali or alkali metal compounds of the fatty acids, sodium or ammonium caseinate, gelatin, albumen, or rosin and water are generally used.

For preparing the final spray composition for application to objects, about two to four gallons of the concentrated oil composition is added to about one hundred gallons of water in a spray tank, and the resulting spray composition is kept in constant agitation during the spraying process. If desired, various amounts of well known germicidal and insecticidal compositions such as phenols, arsenate of lead, creosote, and nicotine may be colloidally incorporated with the concentrated oil composition during the preparation thereof, and this final product is then mixed and agitated with water to form the final spray emulsion.

With emulsions of the character described, it is difficult to obtain a perfectly uniform distribution of the oil film on the surface of the object sprayed. This is probably due to the fact that the emulsion breaks up before it strikes the object, consequently the oil collects in spots, which causes considerable damage if the object is the foliage or fruit of a tree. Furthermore, due to the uneven collection of oil on the object, it is necessary to spray it many times so as to insure a complete coverage by the protective oil film. Also a final spray composition of the character described has little or no penetration properties which are often desirable for certain classes of objects.

The composition of my invention is designed to overcome the defects of the described spray compositions; and in terms of broad inclusion the spray composition of my invention comprises either the described concentrated oil colloid and/or emulsion, or the described water and oil emulsion, containing an emulsifying agent which is miscible and/or colloidally soluble in both the oil and water. For the emulsifying agent, I have found that the reaction product of an organic base, such as an amine, and a fatty acid compound will produce the desirable functions previously set forth. Furthermore, if an excess of free amine compound is used in the spray composition, its penetration properties can be increased, and the degree of penetration of the spray can be controlled by varying the quantity of free amine present.

In terms of greater detail, the emulsifying agent of my composition which is miscible and/or colloidally soluble in both oil and water is prepared by effecting a reaction between a fatty acid and an organic base. For the fatty acids I have found that palmitic, oleic or preferably stearic acids are most satisfactory, but other fatty acids may be used; and for the amines those that combine with fatty acids can be employed. Either alkyl or aryl amines such as monoethanol amine, diethanolamine, commercial triethanolamine or aniline are satisfactory, although other amines such as ethyl, propyl or phenyl amines, or their various substitution products formed by replacing hydrogen in union with the carbon atoms, can be used. The ethanol amines, particularly commercial triethanol amine, are preferred. Commercial triethanol amine contains some monoethanol amine and also some diethanol amine.

Although I prefer to use the straight fatty acids described, substitution products of these fatty acids can be employed, it being only necessary that the fatty acid or substitution product react with the amine to form the reaction product, which is probably a mixed acid amide.

The reaction product of the fatty acid compound and amine is preferably prepared by causing the two compounds to react by the application of heat equivalent to the temperature obtained by a "Bunsen" burner, although the reaction of some of these substances such as oleic acid and triethanol amine may take place at much lower temperatures or even room temperature. In order to prevent the evaporation of the more volatile amines, the reaction may be effected under a reflux condenser. Unless it is desired to have an excess of amine present for controlling the degree of penetration of the final spray composition, it is preferred to have a neutral reaction product. The neutrality can be determined by ordinary litmus paper, and if the reaction is acid, more amine is added to combine with the free acid present, and if an alkaline reaction obtains more fatty acid is added.

When the reaction product of the fatty acid and amine in the proportions of from 1/40 to 1 pound is mixed and agitated with the final water and oil emulsion containing about 100 gallons of water and 1 to 4 gallons of the concentrated oil composition, and the resulting final spray emulsion is applied on an object, the oil film will spread uniformly over the object. Furthermore, the thickness of the film is found to be a function of the quantity of fatty acid-amine reaction product added to the oil and water emulsion.

If a comparatively heavy oil film on objects such as foliage or fruit is desired, the final oil and water emulsion spray may be prepared in the following proportions:

| | |
|---|---|
| Concentrated oil colloid and/or emulsion | 2 to 2½ gallons |
| Neutral reaction product of a fatty acid and amine such as the ethanol amines | ½ to 1 pound |
| Water | Approximately 100 gallons. |

In the preceding example, the quantities of concentrated oil composition, and water are those ordinarily used for the final spray composition, but the quantities of oil, and water may be varied according to the particular object sprayed. Any variation of these quantities merely changes the proportion of oil. By increasing or decreasing the quantity of fatty acid-amine reaction product for a fixed quantity of oil in water, the thickness or weight of the oil film may be controlled, the oil film thickness being a function of the amount of fatty acid-amine reaction product present. For example, if in the above proportions ½ pound of the fatty acid-amine reaction product causes an oil film thickness of a certain weight per unit area, 1 pound of the reaction product will cause an increase of that weight, while ¼ pound will cause a decrease. This has been determined experimentally by spraying final spray compositions on glass plates of the same area, and of known weights, and weighing the oil film after the plates have dried.

The penetration of the oil film on objects such as foliage or fruit may be controlled by incorporating with the fatty acid-amine reaction product an excess of the free amine. For example, if a thin oil film is desired with considerable penetration, the final spray composition may be prepared in the following proportions:

| | |
|---|---|
| Concentrated oil colloid and/or emulsion | 1 to 1½ gallons |
| Neutral reaction product of a fatty acid and amine such as the ethanol amines | 1/10 to ½ pound |
| Free amines such as the ethanol amines | 1/10 to ½ pound |
| Water | Approximately 100 gallons. |

By increasing or decreasing the quantity of free amines present, the penetration of the oil is increased or decreased, thus the degree of penetration is a function of the quantity of free amines present. As in the first example recited, the oil film thickness on the surface may be controlled by varying the quantity of fatty acid-amine reaction product in the final spray composition.

In practice the fatty acid-amine reaction product and/or free amines, may be prepared for incorporation with the oil and water emulsion in various ways. If desired, these compounds in the desired proportions may be incorporated with the concentrated oil composition and the whole mass mixed with water to form the final spray composition. The previously recited germicidal and insecticidal compositions may be also incorporated in the concentrated oil composition. When it is desired to prepare the final spray composition, the prepared concentrated composition is diluted with water in the desired amount, and the object may be then sprayed during agitation of the final spray composition. Also the compounds may be directly added to the final spray emulsion formed by the concentrated oil emulsion diluted with water, and the objects sprayed in a similar manner. Preferably I find it desirable to form a separate composition of the fatty acid-amine reaction product, or the fatty acid-amine reaction product and free amines, together with sufficient water to form a jelly like mass. The mass is preferably mixed with small quantities of stabilizers in proportions of from 1 to 10 per cent by weight of the total mass. Such stabilizers as sodium caseinate, albumen, alkali or alkali metal soaps of fatty acids, calcium caseinate, or rosin and water may be used. This composition may also be mixed with any desirable insecticide or germicide; and it can be directly added to the final oil and water emulsion which may be sprayed in the manner described.

Briefly summarizing my invention, I have found that the emulsifying agent formed by the reaction of a fatty acid and amine is miscible and/or colloidally soluble in both oil and water; and when it is incorporated with commercial concentrated oil emulsions on the market for use in oil and water sprays, or in final oil and water emulsions generally used for sprays, it causes a uniform distribution of the oil film over the object sprayed; and in practically all cases only a single spraying of the object is required. Furthermore, the fatty acid-amine reaction product causes the oil film to spread with ease on interfacial having a high surface tension with respect to the oil and on which it is ordinarily difficult to obtain satisfactory oil covering. By varying the amount of fatty acid-amine reaction product, the thickness of the oil film may be controlled; and by using excess quantities of free amine, the degree of penetration of the oil film may be controlled.

I claim:
1. A spray composition comprising oil, the reaction product of an amine and a fatty acid for improving the spreading of the oil on the object sprayed, and a free amine for controlling the penetration of the oil.
2. The method of controlling the thickness of an oil film and also the penetration of the film on an object sprayed with a spray composition comprising oil, an amine and the reaction product of an amine and a fatty acid, which comprises varying the amount of said reaction product relative to the amount of oil in the spray composition to control the thickness of the applied film, and varying the amount of free amine in the spray composition to control the degree of penetration of said film.

In testimony whereof, I have hereunto set my hand.

FRANK FLOYD LINDSTAEDT.